US012682283B2

(12) United States Patent
Wrobel-Daveau et al.

(10) Patent No.: US 12,682,283 B2
(45) Date of Patent: Jul. 14, 2026

(54) HISTORICAL GEOLOGICAL DATA FOR MACHINE-LEARNING

(71) Applicant: Landmark Graphics Corporation, Houston, TX (US)

(72) Inventors: Jean-Christophe Wrobel-Daveau, Oxford (GB); Graham Baines, Oxford (GB); Graeme Nicoll, Abingdon (GB); Shashwat Verma, Faridabad (IN); Mrigya Fogat, New Delhi (IN)

(73) Assignee: Landmark Graphics Corporation, Houston, TX (US)

( * ) Notice: Subject to any disclaimer, the term of this patent is extended or adjusted under 35 U.S.C. 154(b) by 744 days.

(21) Appl. No.: 18/072,990

(22) Filed: Dec. 1, 2022

(65) Prior Publication Data

US 2024/0185119 A1     Jun. 6, 2024

(51) Int. Cl.
*G06N 20/00* (2019.01)

(52) U.S. Cl.
CPC ..................................... *G06N 20/00* (2019.01)

(58) Field of Classification Search
None
See application file for complete search history.

(56) References Cited

U.S. PATENT DOCUMENTS

| | | | |
|---|---|---|---|
| 8,902,221 | B2 | 12/2014 | Hantschel et al. |
| 11,269,105 | B2 | 3/2022 | Wiltshire et al. |
| 2020/0364623 | A1 | 11/2020 | Al-Hajri et al. |
| 2020/0409334 | A1 | 12/2020 | Samuel et al. |
| 2021/0116598 | A1* | 4/2021 | Thorne ................... E21B 43/00 |
| 2021/0365808 | A1 | 11/2021 | Davies et al. |
| 2022/0195862 | A1 | 6/2022 | Chen |
| 2022/0285938 | A1 | 9/2022 | Mehta et al. |
| 2025/0200256 | A1* | 6/2025 | Kenter ................... G01V 20/00 |

FOREIGN PATENT DOCUMENTS

| | | | | |
|---|---|---|---|---|
| WO | WO-2013066746 A1 * | 5/2013 | ............. | E21B 44/00 |

OTHER PUBLICATIONS

PCT/US2022/051603, "International Search Report and Written Opinion", Aug. 22, 2023, 9 pages.
Diaz-Rodriguez, et al., "Predicting the Emplacement of Cordilleran Porphyry Copper Systems Using a Spatio-Temporal Machine Learning Model", Ore Geology Review 137 (2021), Jun. 13, 2021, 17 pages.
Wrobel-Daveau, et al., "Plate Tectonics as a Tool for Global Screening of Magmatic Arcs and Predictions for Related Porphyry Deposits", Economic Geology, vol. 117 (6), Sep. 1, 2022, 1429-1443.

* cited by examiner

*Primary Examiner* — David R Vincent
(74) *Attorney, Agent, or Firm* — Kilpatrick Townsend & Stockton LLP

(57)     ABSTRACT

A system can be used to incorporate historical geological data into machine learning techniques. The system can receive historical geological data. The system can pre-process the historical geological data by applying a selected, relative-time pre-processing technique to the historical geological data with respect to time-attributed geological phenomena. The system can train a machine-learning model using the pre-processed historical geological data. The system can apply the trained machine-learning model to generate predictions of geological phenomena. The system can provide a user interface to provide a visualization of the predictions of geological phenomena.

19 Claims, 7 Drawing Sheets

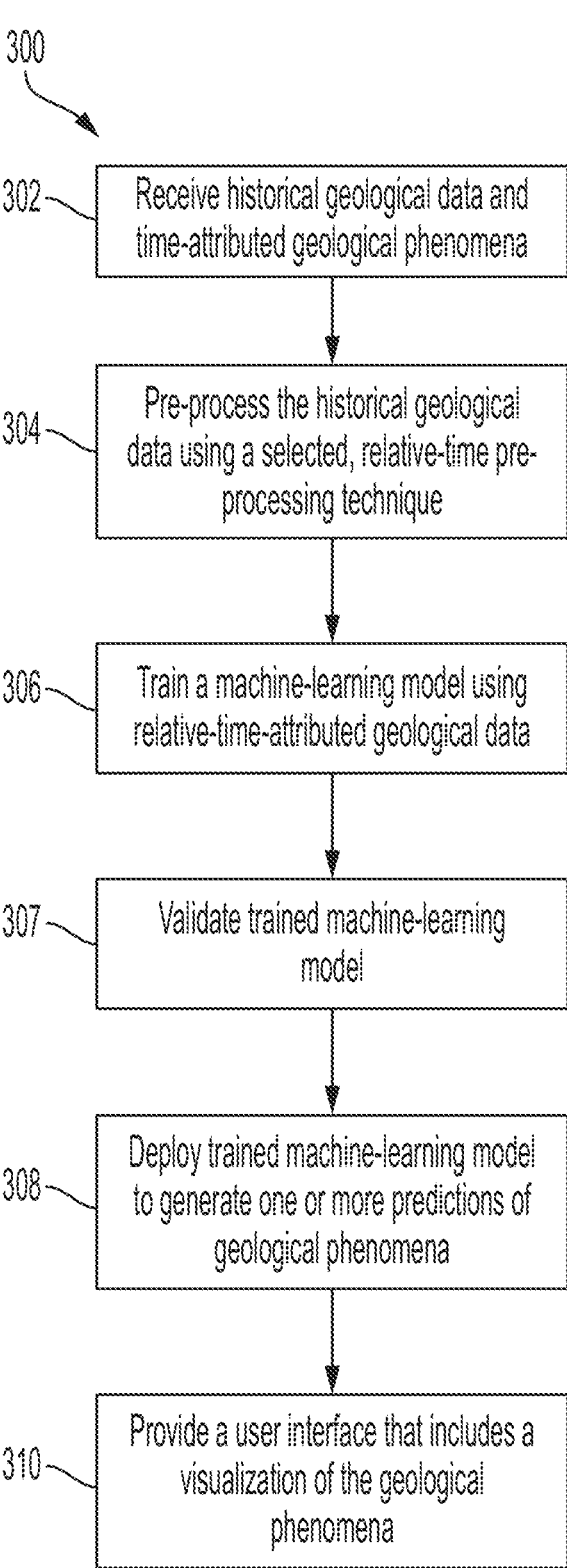

300

302 — Receive historical geological data and time-attributed geological phenomena 304 — Pre-process the historical geological data using a selected, relative-time pre-processing technique 306 — Train a machine-learning model using relative-time-attributed geological data 307 — Validate trained machine-learning model 308 — Deploy trained machine-learning model to generate one or more predictions of geological phenomena 310 — Provide a user interface that includes a visualization of the geological phenomena

FIG. 3

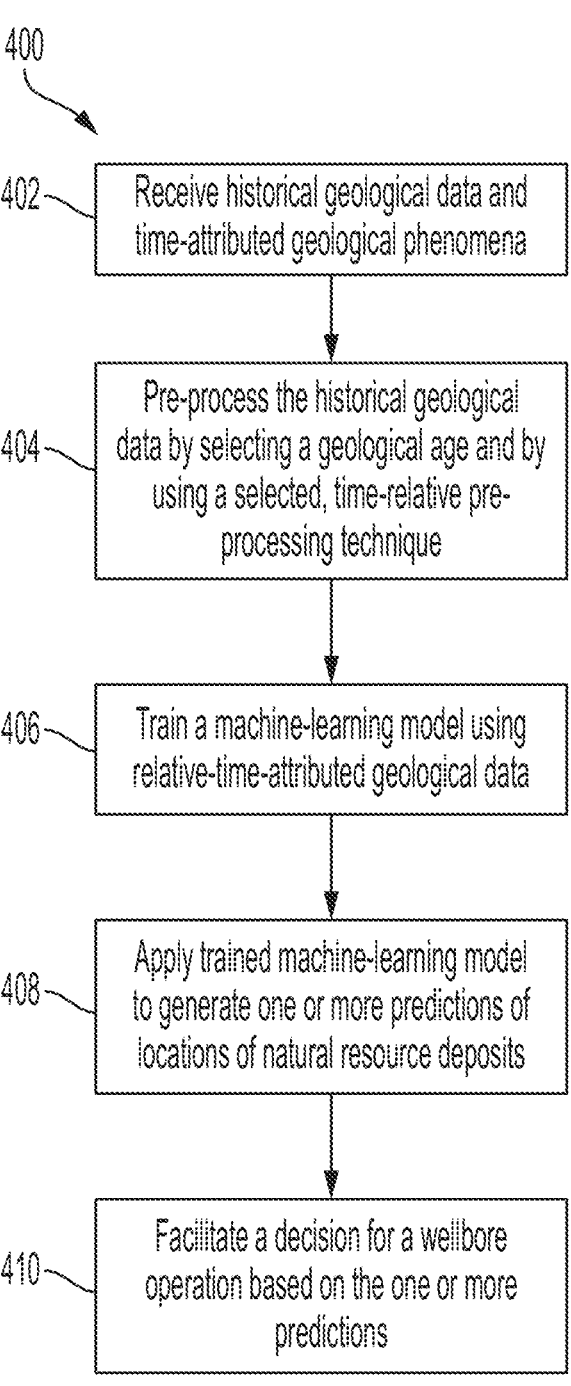

400

402 — Receive historical geological data and time-attributed geological phenomena 404 — Pre-process the historical geological data by selecting a geological age and by using a selected, time-relative pre-processing technique 406 — Train a machine-learning model using relative-time-attributed geological data 408 — Apply trained machine-learning model to generate one or more predictions of locations of natural resource deposits 410 — Facilitate a decision for a wellbore operation based on the one or more predictions

FIG. 4

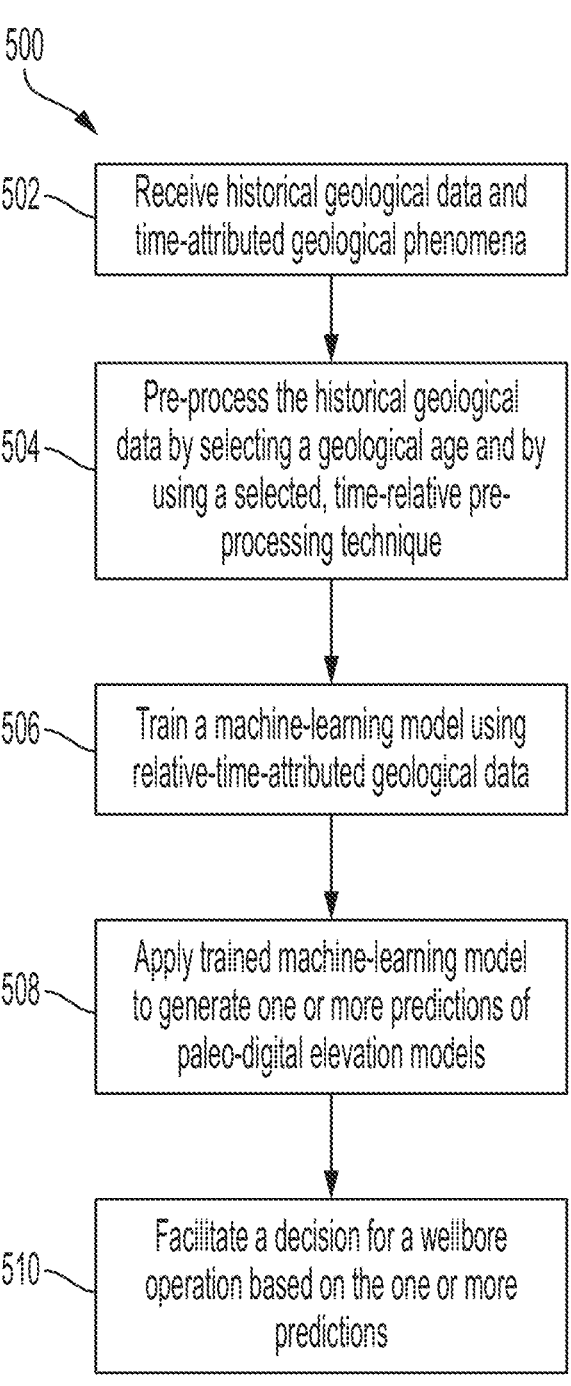

500

502 — Receive historical geological data and time-attributed geological phenomena 504 — Pre-process the historical geological data by selecting a geological age and by using a selected, time-relative pre-processing technique 506 — Train a machine-learning model using relative-time-attributed geological data 508 — Apply trained machine-learning model to generate one or more predictions of paleo-digital elevation models 510 — Facilitate a decision for a wellbore operation based on the one or more predictions

FIG. 5

HISTORICAL GEOLOGICAL DATA FOR MACHINE-LEARNING

TECHNICAL FIELD

The present disclosure relates generally to machine-learning and, more particularly (although not necessarily exclusively), to historical geological data for machine-learning.

BACKGROUND

A well system can include a wellbore, or other extraction system like a mine, etc., that can be formed in a subterranean formation for extracting produced hydrocarbon or other suitable natural resources. An exploration operation can be performed to determine where to form the wellbore, whether to form the wellbore, or the like. The exploration operation may not accurately predict where to form the wellbore or whether to form the wellbore. For example, the exploration operation may misidentify locations having natural resources, may generate poor topographical predictions, and the like.

BRIEF DESCRIPTION OF THE DRAWINGS

FIG. 3 is a flowchart of a process for incorporating historical geological data into a machine-learning model according to one example of the present disclosure.

FIG. 4 is a flowchart of a process for determining estimated locations for a natural resource using machine-learning with historical geological data according to one example of the present disclosure.

FIG. 5 is a flowchart of a process for generating a topographical prediction for an area of interest using machine-learning with historical geological data according to one example of the present disclosure.

DETAILED DESCRIPTION

Figure 1:
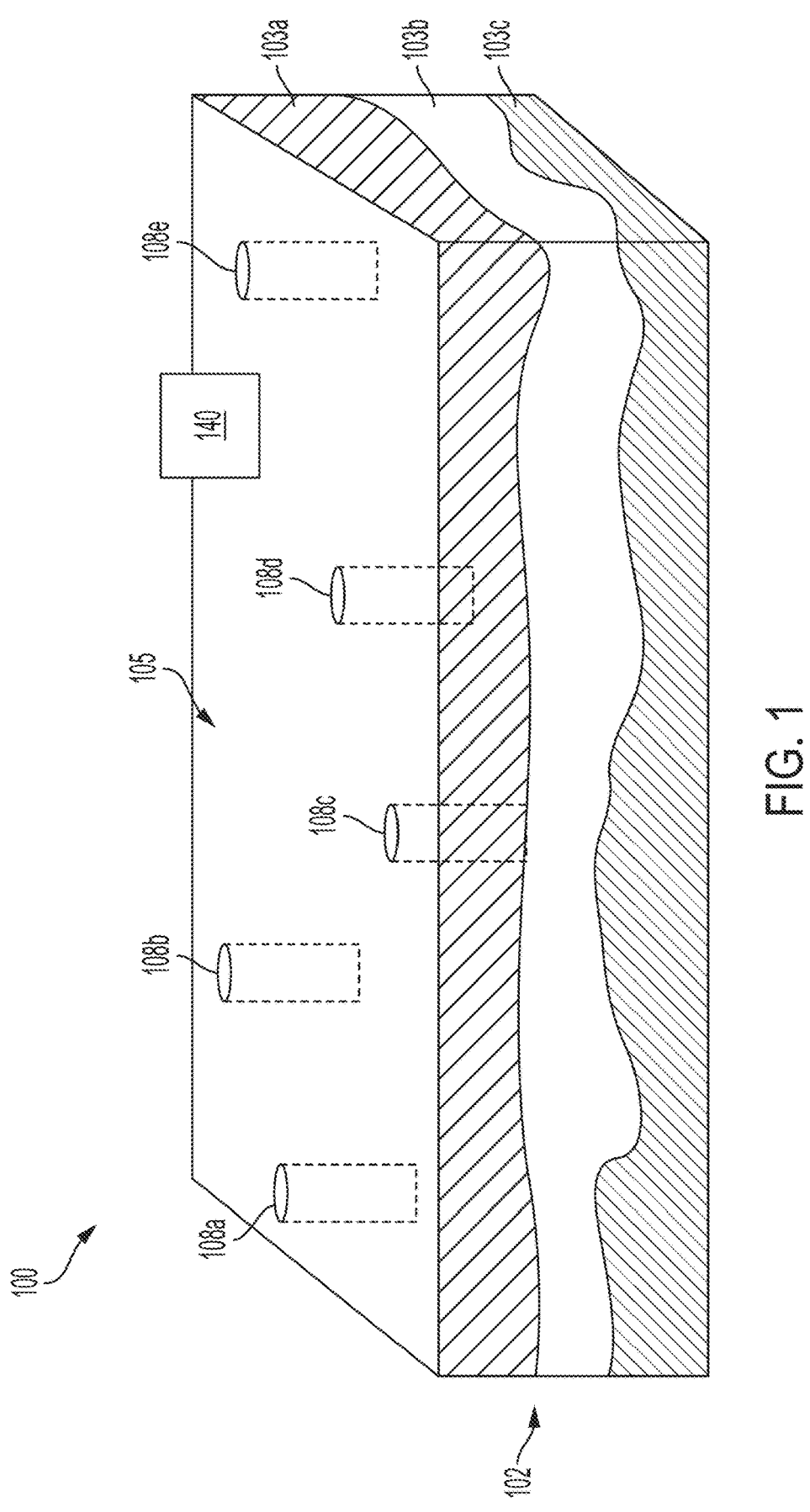
FIG. 1 is a perspective view of a geographic area of interest that includes a set of potential wellbore sites that can be determined or otherwise used with machine-learning techniques that incorporate historical geological data according to one example of the present disclosure.

Certain aspects and examples of the present disclosure relate to machine-learning techniques involving historical geological data for a wellbore operation. The wellbore operation can include a wellbore exploration operation, a wellbore drilling operation, a wellbore production operation, or any other suitable wellbore operation or combination thereof. Additionally or alternatively, the machine-learning techniques involving historical geological data can be used for a mining operation or other natural-resource-related operations. The machine-learning techniques can involve one or more machine-learning models such as a deeplearning neural network, a graph neural network, a convolutional neural network, a support vector machine, or the like. The historical geological data can include (i) geological data previously gathered, for example via a sensor, (ii) geological data inferred from existing geological data, non-geological data, or a combination thereof, and the like. In some examples, the historical geological data can include data about an area of interest, which may include the earth or any subset thereof such as a continent, a country, an island, etc., or any geographical area that can be defined by a user. The data can include lithology, porosity, permeability, geological events, mineral or other natural resource deposits, etc. The historical geological data can be incorporated into the machine-learning techniques via pre-processing techniques, training techniques, and the like to cause the machine-learning techniques to provide predictions for natural resource locations, topographical changes, and other geological phenomena based on the historical geological data.

Integrating geological events or other historical geological data into machine-learning techniques can be difficult. Integrating the geological events or other historical geological data into machine-learning can allow for improved (e.g., compared to other techniques that do not involve historical geological data) predictions of geological phenomena through time. The predictions can include estimating paleo-topography, formation of natural resource deposits such as mineral deposits and hydrocarbon plays, and the like.

Geological phenomena of interest with respect to a wellbore operation can be the result of a series of geological events and processes that occurred before, during, or after the age of a particular phenomenon. For example, an oil field hosted in a reservoir of a particular age may be the result of several events that precede (e.g., basin-formation, source-rock deposition, etc.) or succeed (e.g., seal deposition, burial, trap formation, migration, etc.) reservoir formation. Other geological analyses may be based on prior assumptions about a succession of events through geological time that can be used to predict geological phenomena. This approach may include a play-based exploration or mineral-system approach, which may rely on individual geological expertise and can be limited. For example, the approach may encounter human-related biases, may be limited to pre-defined subsets of data, may encounter geological variability, or the like. Machine-learning techniques can determine complex, multi-variate relationships between inputs and outputs that may address the identified limitations. For example, geological observations through time can be incorporated into a machine-learning framework to facilitate automated and consistent prediction of geological phenomena through time.

Geological phenomena can be predicted using machine-learning techniques based on the relative sequence or timing of events with respect to corresponding phenomena. Stated differently, the geological phenomena can be predicted using machine-learning techniques that incorporate historical geological data into a training and inference pipeline of the machine-learning techniques. In some examples, the machine-learning techniques can generate a prediction of paleo-digital elevation models, or other topological models, for the earth or any subset thereof. Additionally, the machine-learning techniques can predict a likelihood of mineral deposits occurring associated with a particular sequence of tectonic events through time. Other suitable predictions, such as natural resource (e.g. hydrocarbons) accumulations, petroleum system play-based exploration, screening for carbon capture, utilization, and storage, or geothermal prospect definition, can be made using the machine-learning techniques. Additionally, geological input data, such as tectonic data, stratigraphic data, magmatic data, biological data, etc., can be identified, ranked, and correlated with the geological phenomena of interest. Such correlations may highlight unforeseen causal relationships between geological events, natural resource accumulation, and other factors.

The machine-learning techniques may not involve a priori assumption about the input data types such as an assumption based on a theory about the driving processes for a particular geological phenomenon. The contributions, or lack thereof, of the input data types can be analyzed during training of a machine-learning model with the potential to analyze the contribution of the input data types to the final prediction during post-processing. The machine-learning techniques can be applied to classification or regression tasks using a supervised machine-learning model architecture. Inputs and outputs can include any suitable scale and dimensionality, for example 1D, 2D, or 3D spatial dimensions, or time, in response to determining a spatial location and a time attribute for a geological phenomenon of interest. During data preparation, a plate tectonic model can be used to perform a geographic transformation of certain key data from one geological time frame to another, for example to reconstruct geological data from its present geographic position to its location of formation in the geological past or to reconstruct a model or interpretation from the past back to the present-day geographical location. Such transformations can allow data to be interpreted in the correct geographic context for the time of interest, to expose additional interconnected geological phenomena, or via the combination of data-types that reflect different plate-tectonic configurations that can then be placed within a common, interconnected reference frame.

The machine-learning techniques can address challenges associated with integrating geological events into machine-learning frameworks to facilitate predictions of geological phenomena through time. The techniques may involve predicting geological phenomena that can be defined by a spatial location, such as a point, a, line, a surface, a volume, a combination thereof, etc., and geological age. The attributes of the phenomena to be predicted may be categoric, ordinal, or continuous. To predict a particular phenomenon, historical geological data can be used. The historical geological data can include attributes, spatial locations, and geologic ages. In some examples, the attributes, spatial locations, geological ages, and the like may be similar or different between the particular phenomenon and the historical geological data. The historical geological data may include (i) observations (e.g., with sensors) of geological structures, rock chemistry, rock composition, or other rock properties such as porosity, permeability, etc., (ii) geological interpretations including structural models, paleogeographic maps, gross-depositional environment maps, and the like, (iii) models, for example plate tectonic models and derived parameters (e.g., relative plate speed, angle, tectonic setting, etc.) thereof, paleo-digital elevation models, paleo-climate models, stratigraphic forward models, etc., derived from the observations or the geological interpretations.

The machine-learning techniques may involve temporal relationships between geological phenomena or relative, age-based feature generation using historical geological datasets anchored in the geological past, as opposed to (i) present-day data, such as geological maps, satellite images, reflection seismic data, and the like or (ii) considering only geological observation, interpretations, or models occurring and applicable to one given point in time. The temporal relationships and age-based feature generation can facilitate a system predicting an occurrence of natural resource deposits and predicting paleo-topography.

A workflow for a system that can use the machine-learning techniques can involve training a machine-learning model and applying the machine-learning model to generate a prediction. The machine-learning model can be trained to predict a geological phenomenon. A training process can involve various operations. Historical geological data and other suitable data can be compiled or otherwise received relating to the phenomena of interest to predict the phenomena of interest. Ages and locations of the phenomena of interest can be used to pre-process the training data into a relative-time data set. The machine-learning model can be trained, for example via supervised training techniques, using the relative-time pre-processed data. A performance of the trained machine-learning model can be assessed. For example, standard performance metrics, such as qualitative analysis of the output predictions or analysis of feature importance, used in machine-learning can be used to assess a satisfaction level for the performance of the trained machine-learning mode. If performance is not acceptable, the training pipeline can be adjusted, and the machine-learning model can be retrained iteratively until performance of the machine-learning model is satisfactory. Adjustments to the training pipeline can include modifying the relative-time based pre-processing, modifying the machine-learning model, for example changing the model algorithm, model architecture, hyperparameters, loss functions, etc., and the like. Upon determining that the performance of the trained machine-learning model is acceptable, the trained machine-learning model can be deployed.

The trained machine-learning model can be used to assist one or more wellbore operations. The wellbore operations can include a wellbore exploration operation, a wellbore drilling operation, a wellbore stimulation operation, a wellbore production operation, a wellbore abandonment operation, etc. For example, the trained machine-learning model can be used to assist in decision-making for an exploration operation. An age for prediction can be selected, and data for inference can be prepared using the relative time-based method. The deployed machine-learning model can be applied to the temporally pre-processed data. The predictions of the geological phenomena can be analyzed, and a decision with respect to the exploration operation can be made. For example, the predictions can be output, and the system, or any entity thereof, can output a decision to form a wellbore in a particular location, to not form a wellbore, etc.

The machine-learning techniques may involve pre-processing historical geological data to allow the machine-learning model to learn the temporal relationships between the data of interest and the time of the phenomenon of interest. The pre-processing can involve various operations. For example, historical geological data can be selected in the spatial vicinity, which may be co-located or in a region around an observed phenomenon, of the observed phenomenon. The historical geological data may be selected using a plate-tectonic model. The age of the historical geological data relative to the phenomenon of interest can be determined by:

$$t_r = t_d - t_p \qquad \text{(Equation 1)}$$

where $t_d$ is the age of the historical geological data, $t_p$ is the age of the phenomenon, and $t_r$ is the relative age of the historical geological data to the geological phenomenon.

The data can be restricted to a window of relative time that may be defined by a younger limit, $-\Delta t_y \leq 0$, and an older limit $\Delta t_0 \geq 0$, where $(\Delta t_0 + \Delta t_y) > 0$. Thus, the available data can be standardized, and biases due to the varying relative-age ranges of the available data can be removed. For example, and for certain phenomena, events succeeding the phenomena may be known to be irrelevant to the phenomena, so the succeeding events may be removed. For machine-learning architectures, such as graph neural networks, etc., or geological data types, the windowed data and the relative time attribute may be included as an attribute on the historical geological data for inclusion as training data. For other machine-learning models, a consistent data structure may be used, so further processing may be performed.

The further processing can involve splitting the window into several bins and separating observations based on their type. If one or more observations occurs within a given bin, then the bin may be set to one, otherwise the bin is set to zero. Similarly, the occurrences in each bin can be counted, and the number of occurrences can be normalized based on the bin width. If there are many types of observations, if observations are sparse, or for image-based algorithms, raster-based algorithms, or voxel-based algorithms, processing the data to identify the closest observation to the age of the phenomenon may reduce model complexity and reduce memory requirements or the likelihood of overfitting. For ages outside of the window, or if a given event has not been observed before or after, then the closest age can be identified using the oldest or youngest limit of the age window. Another technique for pre-processing may involve counting the observations of a given type within the age window, or determining total counts before or after the age of a particular phenomenon.

The above examples of preprocessing may refer to historical geological data that is binary in nature and that may include a discrete time of occurrence, for example an event either occurred or it didn't. Other pre-processing operations that may be used may include occurrence data with scalar data (e.g., depositional rate) or vector (e.g., plate-motion, paleo-current direction) attributes, and data that defines a continuous function through time. Relative-time preprocessing may capture the available historical geological information in relative-time with respect to the phenomenon to be predicted such that relationships between the geological history and a given phenomenon can be learnt. Then, the relative-time pre-processed data can undergo processing, for example normalization, reshaping to a vector, feature extraction (e.g. PCA), etc., based on the machine-learning model used for prediction.

A system can use machine-learning techniques to predict natural resource occurrences in locations anywhere in the world where their exact geological presence maybe unknown. The system can receive input including (i) one or more geological process datasets, (ii) a plate tectonic model, (iii) a dataset of known occurrences of a resource of interest, or any combination thereof. An occurrence of a natural resource can be defined at least by its geological age and spatial location. Known natural resource occurrences and geological processes can be represented in various spatial domains of the earth's surface or subsurface, for example in 1D, 2D, or 3D, and at any suitable scale of resolution. Occurrences and geological processes can be spatially located and time attributed by the system such that a succession of geological processes and associated importance can be established and temporally related to the occurrences of the natural resources. A hierarchical genetic classification system (e.g., a "class") can be introduced to aid pre-selection of some geological processes relevant for the formation of a given class of natural resources for executing the machine-learning model.

The historical geological datasets can inherently be attributed temporally in the geological past. The historical geological datasets can be used to train the machine-learning model to recognize geological processes of higher importance using the age of a resource formation and its relative timing to geological processes at a given co-location. Datasets of geological processes can be, or can be derived from, paleogeography, plate tectonic model-derived parameters, such as relative plate speed, angle, tectonic setting, etc., structural data, rock chemistry, rock composition, other rock properties including porosity and permeability, etc., paleo-digital elevation models, paleo-climate models, sedimentary systems, paleo-sediment thickness, such as relating to the thickness of sediments deposited for a given interval of time, etc. The input data, such as the processes, can be prepared in a palinspastic space, for example in paleo-geography, and then un-reconstructed to present-day using a plate tectonic model un-reconstruction. The un-reconstruction performed with a plate tectonic model can involve a spatial transformation from paleogeography, for example, in the geological past, to present-day geography performed using the inversion of the finite rotation.

The plate-tectonic-supported un-reconstruction can facilitate using and generating geological process maps and models in their original geography and then comparing them, for example a time-attributed comparison, in present-day space. The machine-learning model can involve a script, code, program, or the like that can analyze spatial relationships or temporal relationships between the dataset of known occurrences and the "co-located" dataset of geological processes to identify the processes of importance (recurring across the dataset—regional to global) that have occurred before, after, or at the time of the natural resource formation. A result of training the machine-learning model can facilitate determining the geological factors that may influence the formation of known occurrences of a natural resource.

Predictions can be generated for testing different machine-learning model parameters such as variation of the relative age bracket between geological processes and age of formation of known natural resource occurrence, etc. The result can be tested against a dataset of known occurrences to evaluate the quality, accuracy, uncertainty, and the like of the machine-learning techniques. The result of can be combined using statistical analysis such as an "ensemble method" that facilitates predicting of the likelihood of presence of a natural resource at a location globally and a range of the geological age of formation thereof.

Additionally, the machine-learning techniques can be used to reconstruct historical topography, such as paleo-digital elevation models, which may be input into one of several geological workflows including stratigraphic forward modelling, paleoclimate simulation, source-to-sink analysis, basin modelling, reservoir modelling, and the like. Observed topography can reflect a complex, non-linear interplay of both solid earth and surficial processes over geological time. The machine-learning techniques can perform a data-driven approach that learns the relationships between modern topography features and geological, oceanographic, or climatic observations. The relationships can be used via the machine-learning techniques to predict topography in the geological past. The input data and predictions can involve raster data. Additionally, the machine-learning techniques can involve a machine-learning model that can include a 2D convolutional neural network or other suitable machine-learning models. Input data in this application can reflect historical geological data known to have an impact on topography. The historical geological data can include an age of orogenic events, an age of the underlying crust, a lithosphere type, a location of plate boundaries, faulting categorized by type, such as normal, reverse, or transform, timing, and the like.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a perspective view of a geological area of interest 100 that includes a set of potential wellbore sites 108a-e that can be determined or otherwise used with machine-learning techniques that incorporate historical geological data according to one example of the present disclosure. In some examples, the sites 108a-e can additionally or alternatively include sites for other natural resource extraction systems such as mines, etc. The geological area of interest 100 can be or include the earth or any subset thereof. For example, the geological area of interest 100 may be a portion of a particular continent or other geographic area in which one or more wellbores, mines, or other natural resource extraction systems can be positioned.

In some examples, the geological area of interest 100 can include a subterranean formation 102 in which wellbores can be positioned at one or more sites of the set of potential wellbore sites 108a-e. The subterranean formation 102 may include a set of layers 103a-c that can include various rock formations, subterranean reservoirs, natural resource deposits, and the like. A natural resource extraction system, such as a wellbore or a mine, can be positioned at one or more of the sites 108a-e and may be formed in the subterranean formation 102 for extracting various materials such as water, oil, various gases, minerals, or other natural resources.

As illustrated, the geological area of interest 100 includes five potential wellbore sites 108a-e, but other suitable numbers of sites 108 can be included in the geological area of interest 100. One or more wellbore operations, such as a wellbore exploration operation, may be performed with respect to the potential wellbore sites 108a-e. The one or more wellbore operations can involve determining a location of the sites 108a-e, whether to form a wellbore, or other natural-resource-extraction system, at one or more of the sites 108a-e, and the like. In some examples, historical data about the geological area of interest 100, or locations adjacent to the geological area of interest 100, can be used with one or more machine-learning models to determine the sites 108a-e, to determine whether to form a natural-resource-extraction system at one or more of the sites 108a-e, etc.

A computing device 140 can be disposed at the surface 105 of the subterranean formation 102 for training a machine-learning model using the historical geological data, for executing the trained machine-learning model, or for a combination thereof. In some examples, the computing device 140 can be positioned below the surface 105 and in the subterranean formation 102, remote from the subterranean formation 102, or the like. The computing device 140 can include a processor and a memory that can store processor-executable instructions for performing various operations with respect to the geological area of interest 100. For example, the computing device 140 can pre-process the historical geological data about the geological area of interest 100, can train the machine-learning model using relative-time pre-processed historical geological data, and can apply the trained machine-learning model to generate one or more predictions of geological phenomena with respect to the geological area of interest 100. In some examples, the computing device 140 can use an output of the trained machine-learning model to control a wellbore operation such as a wellbore exploration operation.

Figure 2:
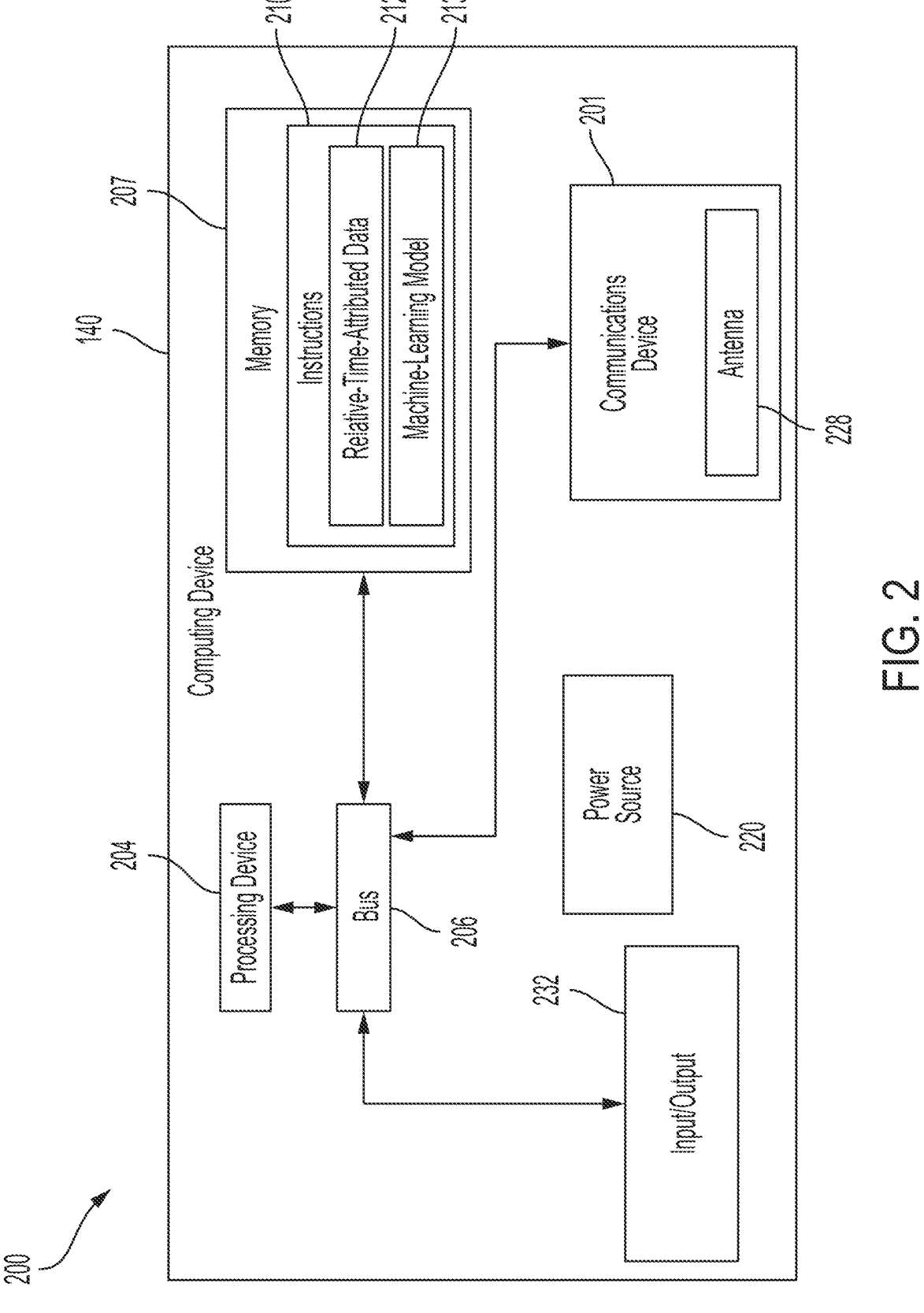
FIG. 2 is a block diagram of a computing system for using historical geological data in machine-learning techniques according to one example of the present disclosure.

FIG. 2 is a block diagram of a computing system 200 for using historical geological data in machine-learning techniques according to one example of the present disclosure. The machine-learning techniques can be applied to one or more wellbore operations, one or more other natural-resource-extraction operations, or the like. The computing system 200 can include the computing device 140. Components illustrated in FIG. 2 may be integrated into a single structure, such as in a single housing of the computing device 140. Alternatively, the components shown in FIG. 2 may be distributed from other components and in electrical communication with the other components.

The computing device 140 can include a processing device 204, a memory device 207, an input/output device 232, and a communications device 201 that can be communicatively coupled via a bus 206. The input/output device 232 can include a display device, such as a screen or a monitor. Additionally, the input/output device 232 can include a keyboard or a mouse. A user can view data relating to outputs of the machine-learning model 213, or other information that can be provided by the computing device 140, via the display device and can provide input to the computing device 140 via the input/output device 232, for example via a user interface provided by the computing device 140. The input can be used by the computing device 140 to generate one or more predictions of geological phenomena relating to the geological area of interest 100 based on historical geological data associated with the geological area of interest 100.

The processing device 204 can include one processing device or multiple processing devices. Non-limiting examples of the processing device 204 can include a field-programmable gate array (FPGA), an application-specific integrated circuit (ASIC), a micro-processing device, etc. The processing device 204 can execute instructions 210 stored in the memory device 207 to perform operations. In some examples, the instructions 210 can include processing device-specific instructions generated by a compiler or an interpreter from code written in any suitable computer-programming language such as C, C++, C #, Java, Perl, Python, etc.

The processing device 204 can be communicatively coupled to the memory device 207 via the bus 206. The memory device 207 can include one memory or multiple memories and can be non-volatile and may include any type of memory that retains stored information when powered off. Non-limiting examples of the memory can include electrically erasable and programmable read-only memory (EEPROM), flash memory, or any other type of non-volatile memory. At least some of the memory can include a non-transitory computer-readable medium from which the processing device 204 can read the instructions 210. The non-transitory computer-readable medium can include electronic, optical, magnetic, or other storage devices capable of providing the processing device 204 with computer-readable instructions 210 or other program code. Examples of the non-transitory computer-readable medium include magnetic disk(s), memory chip(s), ROM, random-access memory (RAM), an ASIC, a configured processing device, optical storage, or any other medium from which a computer processing device can read the instructions 210.

In some examples, the memory device 207 can include instructions 210 for causing the processing device 204 to generate predictions of geological phenomena relating to the geological area of interest 100. In some examples, the processing device 204 can access the instructions 210 via the memory device 207 to train a machine-learning model 213 using relative-time-attributed data 212, execute the machine-learning model 213, or the like. The processing device 204 can access the instructions 210 to receive historical geological data about the geological area of interest 100 and to pre-process the historical geological data to generate the relative-time-attributed data 212. The processing device 204 can additionally access the instructions 210 to train the machine-learning model 213 and to use the machine-learning model 213 to generate predictions of geological phenomena for the geological area of interest 100.

The computing device 140 can include a power source 220. The power source 220 can be in electrical communication with the computing device 140 and any component thereof such as the communications device 201, the input/output device 232, and the like. In some examples, the power source 220 can include a battery or an electrical cable such as a wireline. The power source 220 can include an AC signal generator. The computing device 140 can operate the power source 220 to apply a transmission signal to the antenna 228 to generate electromagnetic waves that convey data relating to the geological area of interest 100, the historical geological data, the predictions of geological phenomena, etc. to other systems. For example, the computing device 140 can cause the power source 220 to apply a voltage with a frequency within a specific frequency range to the antenna 228 for causing the antenna 228 to generate a wireless transmission. In other examples, the computing device 140, rather than the power source 220, can apply the transmission signal to the antenna 228 for generating the wireless transmission.

In some examples, part of the communications device 201 can be implemented in software. For example, the communications device 201 can include additional instructions stored in the memory device 207 for controlling functions of the communication device 201. The communications device 201 can receive signals from remote devices and transmit data to remote devices. For example, the communications device 201 can transmit wireless communications that are modulated by data via the antenna 228. In some examples, the communications device 201 can receive signals (e.g., associated with data to be transmitted) from the processing device 204 and amplify, filter, modulate, frequency shift, or otherwise manipulate the signals. In some examples, the communications device 201 can transmit the manipulated signals to the antenna 228. The antenna 228 can receive the manipulated signals and responsively generate wireless communications that carry the data.

FIG. 3 is a flowchart of a process 300 for incorporating historical geological data into a machine-learning model according to one example of the present disclosure. At block 302, the computing device 140 receives historical geological data about the geological area of interest 100, time-attributed geological phenomena associated with the geological area of interest 100, and the like. The historical geological data can be measured, such as by using sensors positioned with respect to the geological area of interest 100, can be inferred from existing measurements or models relating to the geological area of interest 100, can be accessed from a data store that includes measured or inferred data about the geological area of interest 100, or any combination thereof.

In some examples, the historical geological data can include geological observations, geological interpretations, geological models, or any combination thereof. The geological observations may include observations, for example using sensors, of geological structures, rock chemistry, rock composition, or other rock properties such as porosity, permeability, etc. The geological interpretations can include structural models, paleogeographic maps, gross-depositional environment maps, and the like. The geological models can include plate tectonic models and derived parameters thereof, such as relative plate speed, angle, tectonic setting, etc., paleo-digital elevation models, paleo-climate models, stratigraphic forward models, and the like. The geological models can be derived from the geological observations, the geological interpretations, or a combination thereof.

At block 304, the computing device 140 pre-processes the historical geological data using a selected, relative-time pre-processing technique. Pre-processing the historical geological data can involve generating relative-time-attributed geological data based on the historical geological data. The relative-time pre-processing technique can be used to generate the relative-time-attributed geological data. In some examples, the relative-time pre-processing technique can be selected from a set of pre-processing techniques that includes an initial relative timing pre-processing technique, an event barcode pre-processing technique, an event histogram pre-processing technique, a closest age pre-processing technique, a total count pre-processing technique, and any other pre-processing techniques that can be used to generate the relative-time-attributed geological data. Additionally, the computing device 140 may select, or receive input to cause the computing device 140 to select, one or more pre-processing techniques of the set of pre-processing techniques.

The initial relative timing pre-processing technique can involve an initial pre-processing to define relative timing of geological observations or inferences, for example from the historical geological data received at the block 302, with respect to the age of the geological phenomenon of interest. Data to be included can be delineated using an age window that can be defined by an initial time, or oldest geological time, and a present time, or youngest geological time. Depending on the machine-learning model to be used, the relative age data can be included in the machine-learning model, for example a graph neural network. For other machine-learning models, further pre-processing may be performed to define a consistent data structure for the training data.

The event barcode pre-processing technique can involve splitting the age window of time into a number of bins. The observations, inferences, or a combination thereof can be separated based on an observation type or inference type. Thus, if one or more observations or inferences occurs within a given bin, then the bin can be set to one, otherwise the bin can be set to zero. The event histogram pre-processing technique can involve counting occurrences of the observations or inferences in the given bin. The bins can be shaded, colored, or otherwise differentiated among one another with respect to a number of observations and inferences in each bin, thus generating an event histogram of the observations and inferences.

The closest age pre-processing technique can involve defining a closest observation or inference to the phenomenon of interest with respect to age. To reduce machine-learning model complexity (e.g., training or inference), observations and inferences can be reduced to those with a geological age closest to the geological age of the geological phenomenon of interest. If there are many types of observations, inferences or a combination thereof, or if observations and inferences are sparse, then pre-processing the historical geological data to define the closest observation or inference to the age of the geological phenomenon of interest may reduce complexity and any likelihood of over-fitting. For ages outside of the age window, or if a given event has not been observed before or after the geological phenomenon of interest, then a consistent approach may involve defining the closest age using the oldest or youngest limit of the age window. The total count pre-processing technique can involve, for dense observations and inferences, a count of the observations and inferences of a given type within the age window. In some examples, the total count pre-processing techniques can aggregate total counts before or after the age of the geological phenomenon of interest.

At block 306, the computing device 140 trains a machine-learning model using relative-time-attributed geological data. In some examples, the computing device 140 can select a first subset of the relative-time-attributed geological data to be training data and can select a second subset of the relative-time-attributed geological data to be validation data. The training data, the validation data, or a combination thereof can include a set of labeled data points that can be used in supervised learning and validation operations.

The computing device 140 can input the training data into the machine-learning model to train the machine-learning model. For example, the computing device 140 can input the first subset of the relative-time-attributed geological data into the machine-learning model to tune or otherwise optimize weights or other parameters of one or more layers of the machine-learning model. In some examples, the computing device 140 can iteratively input the training data into the machine-learning model to train the machine-learning model. Additionally or alternatively, the computing device 140 can perform one or more supervised learning techniques, for example since the first subset of the relative-time-attributed geological data includes labeled data, for training the machine-learning model. Other training techniques can be used by the computing device 140 to train the machine-learning model to make predictions of geological phenomena with respect to the geological area of interest 100.

The computing device 140 can validate the trained machine-learning model using the validation data. For example, the computing device 140 can input the second subset of the relative-time-attributed geological data into the trained machine-learning model to cause the trained machine-learning model to generate one or more predictions of geological phenomena with respect to the geological area of interest 100. The one or more predictions can be compared to an acceptance criteria to determine whether the trained machine-learning model is performing at an adequate level of accuracy. For example, an error metric can be measured based on a comparison between the one or more predictions and the acceptance criteria, and if the error metric is below a threshold error value, the trained machine-learning model may be validated. Additionally, if the error metric is above the threshold error value, the trained machine-learning model may not be validated and may, instead, be retrained using the training data or other data for training the machine-learning model.

At block 307, the computing device 140 validates the trained machine-learning model. The computing device 140 can use at least a subset of the received historical geological data, the time-attributed geological phenomena, and the like to validate the trained machine-learning model. In some examples, if predictions from the trained machine-learning model exceed an acceptance criteria, the computing device 140 can determine that the trained machine-learning model is valid and is ready to be deployed.

At block 308, the computing device 140 applies the trained machine-learning model to generate one or more predictions of geological phenomena. The computing device 140 can input the historical geological data, a geological age of a geological phenomenon of interest, and other suitable data to cause the trained machine-learning model to generate one or more predictions for the geological phenomenon of interest. The geological phenomenon of interest may include a natural resource deposit, a topographical representation, or the like relating to the geological area of interest 100.

In some examples, the computing device 140 can relative-time pre-process the historical geological data, the geological age of the geological phenomenon of interest, and the other suitable data. Relative-time pre-processing can involve pre-processing the historical geological data, the geological age of the geological phenomenon of interest, and the other suitable data using one or more pre-processing techniques of the set of pre-processing techniques described with respect to the block 304 of the process 300. Relative-time pre-processing the received data can involve generating relative-time-attributed data, and the relative-time-attributed data can be input into the trained machine-learning model. The trained machine-learning model can use the relative-time-attributed data to generate one or more predictions of the geological phenomena. For example, the computing device 140 can input the relative-time-attributed data into the trained machine-learning model, and the trained machine-learning model can generate and output the one or more predictions, which may include a prediction of natural resource deposits with respect to the geological area of interest 100, a prediction of topography of the geological area of interest 100, or the like.

At block 310, the computing device 140 provides a user interface that includes a visualization of the one or more predictions. The user interface may include a background that can include a geographic representation of the geological area of interest 100. Additionally, the user interface can include a set of visual indicators arranged on the background. Each visual indicator of the set of visual indicators can be positioned on a particular location of the background that corresponds to a particular real-world location at the surface or in the sub-surface of the geological area of interest 100. Additionally, each visual indicator can indicate, for example via a heat map, colors or shading, sizing, or the like, a likelihood of the geological phenomenon of interest existing at the corresponding particular real-world location. The computing device 140 can generate the set of visual indicators using the predictions generated by the trained machine-learning model. For example, each visual indicator may be generated by the computing device 140 based on a different prediction of the one or more predictions generated by the trained machine-learning model. Additionally or alternatively, one or more of the visual indicators may indicate a relative orogenic age of the corresponding real-world location.

FIG. 4 is a flowchart of a process 400 for determining estimated locations for one or more natural resource deposits using machine-learning with historical geological data according to one example of the present disclosure. At block 402, the computing device 140 receives historical geological data. The historical data can be similar or identical to the historical geological data received at the block 302 of the process 300. For example, the historical geological data can include measured data, stored data, inferred data, or any combination thereof relating to the geological area of interest 100.

At block 404, the computing device 140 pre-processes the historical geological data using a selected, relative-time pre-processing technique. Pre-processing the historical geological data in the process 400 may follow similar or identical techniques as discussed with respect to the block 304 of the process 300. For example, the relative-time pre-processing technique can be selected from a set of pre-processing techniques, and the selected, relative-time pre-processing technique can be used to generate relative-time-attributed geological data based on the historical geological data. In some examples, the computing device 140 can receive the historical geological data as input, pre-process the historical geological data using the selected, relative-time pre-processing technique, and output the relative-time-attributed geological data.

At block 406, the computing device 140 trains a machine-learning model using relative-time-attributed geological data. In some examples, the computing device 140 can train and validate the machine-learning model using operations similar or identical to the operations described with respect to the block 306 of the process 300. For example, the computing device 140 can train the machine-learning model using training data that includes a first subset of the relative-time-attributed geological data, and the computing device 140 can validate the trained machine-learning model using validation data that include a second subset of the relative-time-attributed geological data. Other training and validation operations can be used by the computing device 140 to train and validate the machine-learning model and configure the trained machine-learning model to generate one or more predictions of geological phenomena relating to the geological area of interest 100.

At block 408, the computing device 140 applies the trained machine-learning model to generate one or more predictions of natural resource deposits. In some examples, the trained machine-learning model can generate the predictions using operations similar or identical to the operations described with respect to the block 308 of the process 300. For example, the computing device 140 can generate relative-time-attributed data based on received historical geological data, an age of a geological phenomenon of interest, etc. The computing device 140 can input the relative-time-attributed data into the trained machine-learning model, which can output the predictions. The predictions can include one or more predictions for locations of natural resource deposits with respect to the geological area of interest 100.

At block 410, the computing device 140 facilitates a decision for a wellbore operation based on the one or more predictions. In some examples, the computing device 140 can use the trained machine-learning model to facilitate an operation relating to one or more natural resources. The operation can include a wellbore exploration operation, a mining exploration operation, or other suitable operation that can use the predictions generated by the trained machine-learning model. The computing device 140 can, in response to the trained machine-learning model generating the predictions, generate and output a command to control the operation. In some examples, the command can cause a wellbore, a mine, or other natural-resource-extraction system to be formed in at least a portion of the geological area of interest 100. In other examples, the command can cause the operation to cease or otherwise take no further action. The computing device 140 may additionally output, for example via a user interface, the generated predictions relating to locations of one or more natural resource deposits to facilitate one or more decisions made by an operator, supervisor, engineer, or the like of the operation.

FIG. 5 is a flowchart of a process for generating a topographical prediction for an area of interest using machine-learning with historical geological data according to one example of the present disclosure. At block 502, the computing device 140 receives historical geological data. The historical data can be similar or identical to the historical geological data received at the block 302 of the process 300. For example, the historical geological data can include measured data, stored data, inferred data, or any combination thereof relating to the geological area of interest 100.

At block 504, the computing device 140 pre-processes the historical geological data using a selected, relative-time pre-processing technique. Pre-processing the historical geological data in the process 400 may follow similar or identical techniques as discussed with respect to the block 304 of the process 300. For example, the relative-time pre-processing technique can be selected from a set of pre-processing techniques, and the selected, relative-time pre-processing technique can be used to generate relative-time-attributed geological data based on the historical geological data. In some examples, the computing device 140 can receive the historical geological data as input, pre-process the historical geological data using the selected, relative-time pre-processing technique, and output the relative-time-attributed geological data.

At block 506, the computing device 140 trains a machine-learning model using relative-time-attributed geological data. In some examples, the computing device 140 can train and validate the machine-learning model using operations similar or identical to the operations described with respect to the block 306 of the process 300. For example, the computing device 140 can train the machine-learning model using training data that includes a first subset of the relative-time-attributed geological data, and the computing device 140 can validate the trained machine-learning model using validation data that include a second subset of the relative-time-attributed geological data. Other training and validation operations can be used by the computing device 140 to train and validate the machine-learning model and configure the trained machine-learning model to generate one or more predictions of geological phenomena relating to the geological area of interest 100.

At block 508, the computing device 140 applies the trained machine-learning model to generate one or more predictions of topological models for the geological area of interest. In some examples, the trained machine-learning model can generate the predictions using operations similar or identical to the operations described with respect to the block 308 of the process 300. For example, the computing device 140 can generate relative-time-attributed data based on received historical geological data, an age of a geological phenomenon of interest, etc. The computing device 140 can input the relative-time-attributed data into the trained machine-learning model, which can output the predictions. The predictions can include one or more predictions for a topography, such as a paleo-digital elevation model, of the geological area of interest 100.

At block 510, the computing device 140 facilitates a decision for a wellbore operation based on the one or more predictions. In some examples, the computing device 140 can use the trained machine-learning model to facilitate an operation relating to one or more natural resources. The operation can include a wellbore exploration operation, a mining exploration operation, or other suitable operation that can use the predictions generated by the trained machine-learning model. The computing device 140 can, in response to the trained machine-learning model generating the predictions, generate and output a command to control the operation. In some examples, the command can cause a wellbore, a mine, or other natural-resource-extraction system to be formed in at least a portion of the geological area of interest 100. In other examples, the command can cause the operation to cease or otherwise take no further action. The computing device 140 may additionally output, for example via a user interface, the generated predictions relating to topography of the geological area of interest 100 to facilitate one or more decisions made by an operator, supervisor, engineer, or the like of the operation.

Figure 6:
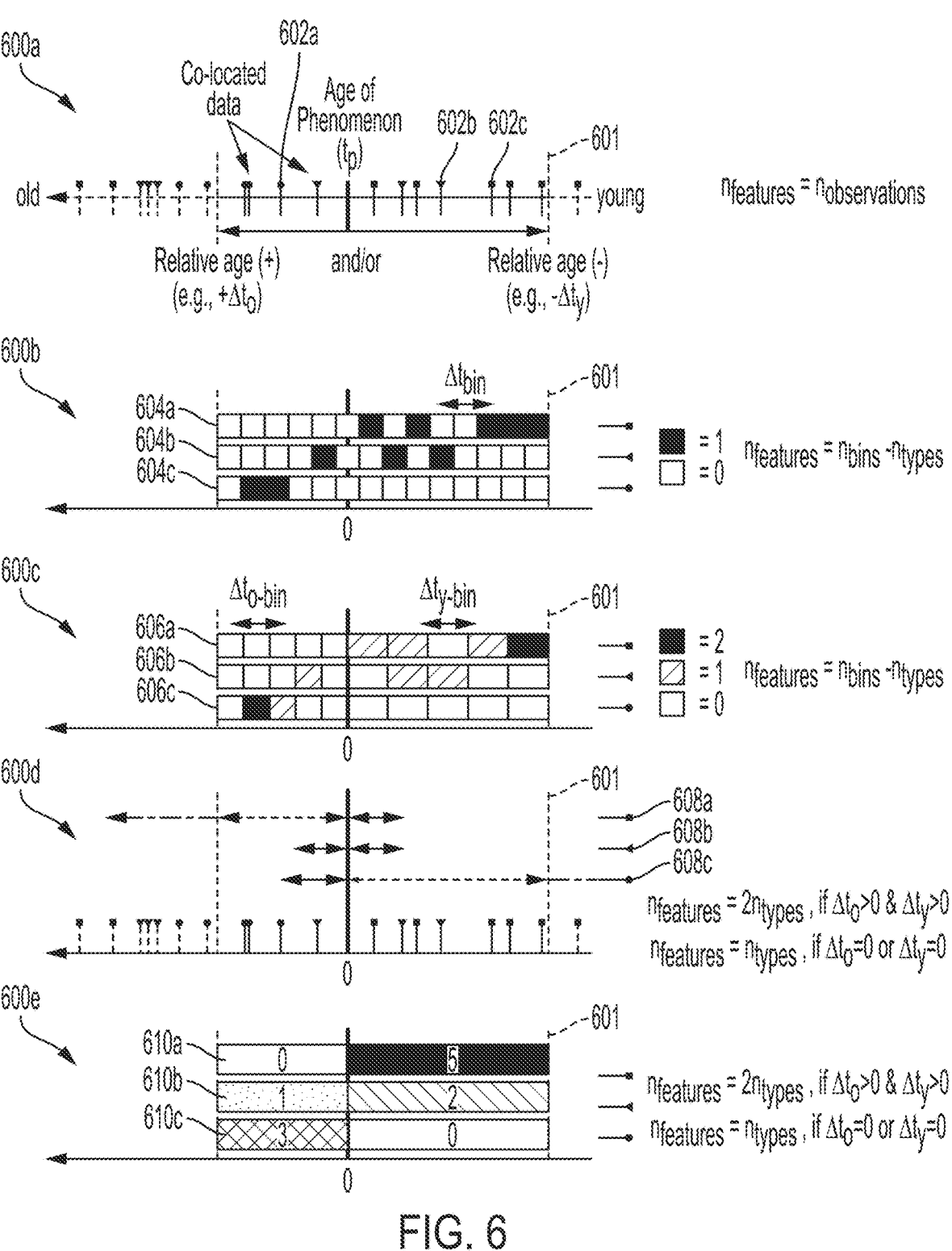
FIG. 6 is a set of examples of relative-time pre-processing techniques that can be used to incorporate historical geological data into machine-learning according to one example of the present disclosure.

FIG. 6 shows examples of relative-time pre-processing technique that can be used to incorporate historical geological data into machine-learning according to one example of the present disclosure. A first relative-time pre-processing technique 600a is to select historical geological data that is co-located with the phenomenon to be predicted. In some examples, the computing device 140 can identify geological phenomena such as geological observations, geological inferences, or a combination thereof. The geological observations, geological inferences, or a combination thereof may be categorized by the computing device 140 into one of a set of categories such as natural processes including but not limited to tectonic, stratigraphic, topographic, climatic, pre, syn or post-formation processes, and the like. As illustrated, the computing device 140 can categorize the co-located historical geological data input into three separate categories. The age of the respective phenomena may be $t_p$, as in Equation 1, and the first step for subsequent processing 600b-e is to calculate the relative age $t_r$ of the historical geological data using Equation 1. The relative-time attributed co-located geological data (e.g. "events") can then be used in subsequent relative-time pre-processing techniques 600b-e. The first relative-time pre-processing technique 600a can involve defining an age window 601 and populating the age window 601 with the geological co-located data. The populated geological observations, the geological inferences, or a combination thereof (e.g., "events") can include a first event 602a corresponding to a first category, a second event 602b corresponding to a second category, and a third event 602c corresponding to a third category. Other suitable numbers of events and categories can be identified or populated in the age window 601 by the computing device 140.

A second relative-time pre-processing technique 600b can involve generating binary bins for the age window 601. For example, the computing device 140 can generate a set of bins dispersed in the age window 601. The set of bins can include one, two, three, four, or more bins equally sized (e.g., the same or similar time represented by each bin) and spaced in the age window 601. The second relative-time pre-processing technique 600b can involve, for each generated bin, determining whether an event occurred in the respective bin. If an event did occur in the respective bin, the computing device 140 can set the value of the respective bin to be one, and if an event did not occur in the respective bin, the computing device 140 can set the value of the respective bin to zero. As illustrated, the computing device 140 can generate a first set of bins 604a corresponding to a first event type, a second set of bins 604b corresponding to a second event type, and a third set of bins 604c corresponding to a third event type. The bins of the first set of bins 604a, the second set of bins 604b, and the third set of bins 604c can be shaded (e.g., indicating a value of one since an event is detected) or unshaded (e.g., indicating a value of zero since an event is not detected).

A third relative-time pre-processing technique 600c can involve generating a histogram in the age window 601 based on the events identified by the computing device 140. As illustrated, the computing device 140 can generate a first histogram 606a corresponding to the first event type, a second histogram 606b corresponding to the second event type, and a third histogram 606c corresponding to the third event type. Each histogram can include a different set of bins that may each be equal or approximately equal in number of bins. The third relative-time pre-processing technique 600c can involve, for each generated bin, determining how many events occurred in the respective bin. If an event did not occur in the respective bin, the computing device 140 can set the value of the respective bin to be zero, and if one or more events did occur in the respective bin, the computing device 140 can set the value of the respective bin to be the number of events identified. As illustrated, the bins of the first histogram 606a, the bins of the second histogram 606b, and the bins of the third histogram 606c can be shaded according to the number of events corresponding to each respective bin.

A fourth relative-time pre-processing technique 600d can involve determining a closest event to a geological phenomenon of interest based on relative age of the closest event with respect to the geological phenomenon of interest. In some examples, the fourth relative-time pre-processing technique 600d can reduce a complexity of pre-processing, for example if an excessive number of events (or a limited number of events) are identified by the computing device 140. The fourth relative-time pre-processing technique 600d can involve generating one or more line plots. As illustrated for the fourth relative-time pre-processing technique 600d, the computing device 140 can generate a first line plot 608a corresponding to the first event type, a second line plot 608b corresponding to the second event type, and a third line plot 608c corresponding to the third event type. Each line plot may indicate a closest corresponding events is to the geological phenomenon of interest within the age window 601. In some examples, no events of a particular event type may be within the age window 601, and, in such cases, the closest corresponding events may be set to the youngest age of the age window 601, the oldest age of the age window 601, or a combination thereof.

A fifth relative-time pre-processing technique 600e can involve a total count of events before the geological phenomenon of interest, after the geological phenomenon of interest, or a combination thereof. In some examples, the computing device 140 can generate two bins for each event type. As illustrated, a first set of bins 610a corresponding to the first event type includes two bins, a second set of bins 610b corresponding to the second event type includes two bins, and a third set of bins 610c corresponding to the third event type includes two bins. Each bin for each set of bins may represent a number of a corresponding events occurring before or after the geological phenomenon of interest. For example, a first bin of the first set of bins 610a can represent a number of occurrences of the first event type before the geological phenomenon of interest, and a second bin of the first set of bins 610a can represent a number of occurrences of the first event type after the geological phenomenon of interest, etc.

Figure 7:
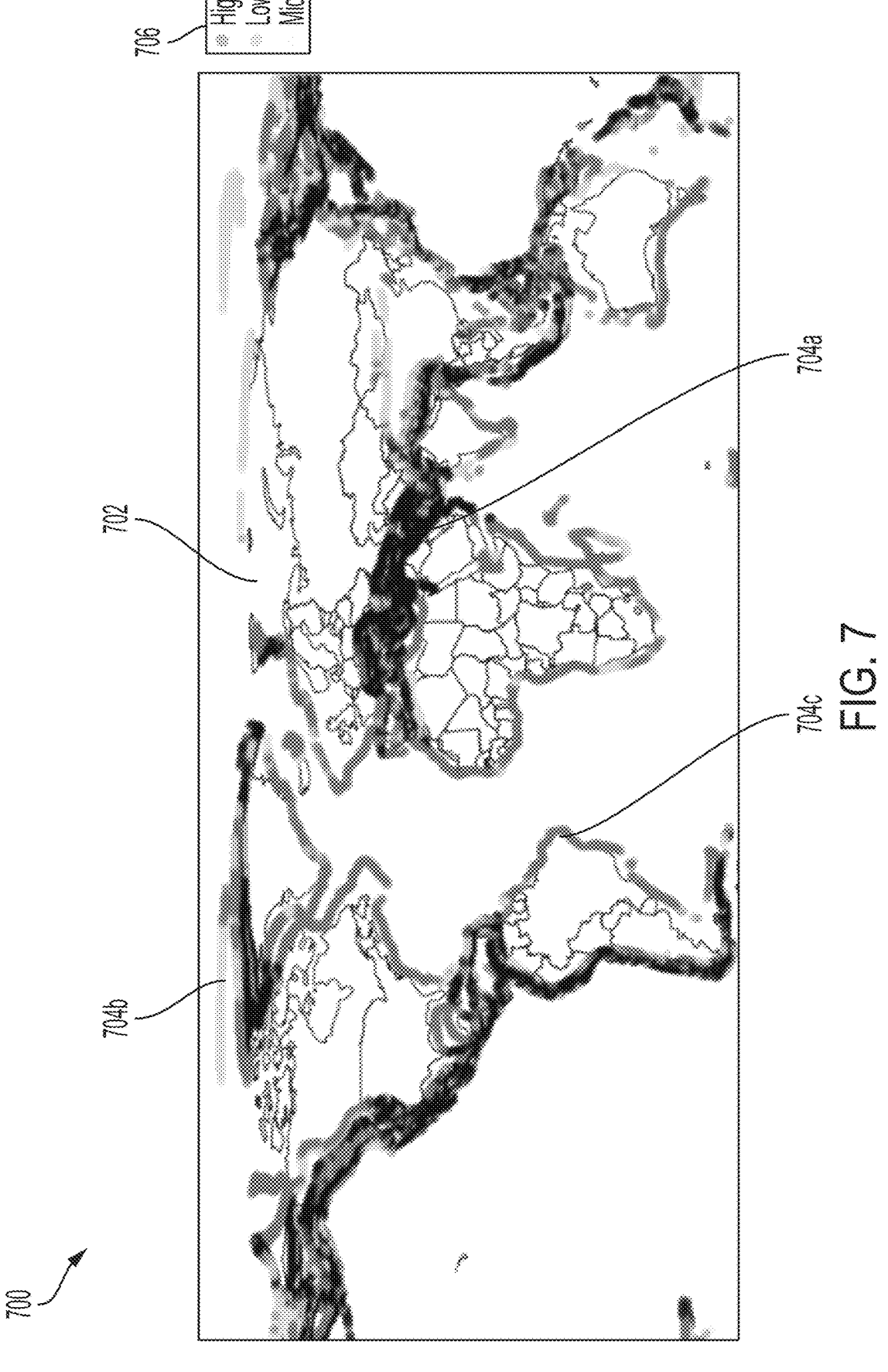
FIG. 7 is an example of a user interface the prediction of the likelihood of occurrence of a natural resource that can be generated by a machine-learning model that uses relative-time pre-processed historical geological data according to one example of the present disclosure.

FIG. 7 is an example of a user interface 700 that can be generated by a machine-learning model 213 that uses relative-time pre-processed historical geological data according to one example of the present disclosure. As illustrated, the user interface 700 includes a background 702 and a set of visual indicators. The background 702 can represent the geological area of interest 100. For example, and as illustrated, the background 702 represents the earth, which may be the geological area of interest 100. Additionally or alternatively, the background 702 may be a spatial definition, such as a geographic map, a spatially located subsurface model in 1D, 2D or 3D, or the like, of the geological area of interest 100. The set of visual indicators can include first indicators 704a, second indicators 704b, and third indicators 704c. The first indicators 704a can include examples of indicators that visually indicate a high likelihood that a geological phenomenon (e.g., a natural resource deposit) is present at a corresponding location. The second indicators 704b can include examples of indicators that visually indicate a medium likelihood that a geological phenomenon (e.g., a natural resource deposit) is present at a corresponding location. The third indicators 704c can include examples of indicators that visually indicate a low likelihood that a geological phenomenon (e.g., a natural resource deposit) is present at a corresponding location. The set of indicators may correspond to a key 706 included on the user interface such that the key 706 can inform an entity of what the set of indicators indicate.

In some aspects, systems, methods, and non-transitory computer-readable mediums for historical geological data for machine-learning model are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processing device; and a non-transitory computer-readable memory device that includes instructions executable by the processing device for causing the processing device to perform operations comprising: receiving historical geological data that includes about an area of interest; pre-processing the historical geological data by applying a selected, relative-time pre-processing technique to the historical geological data with respect to time-attributed geological phenomena to generate relative-time-attributed geological data; training a machine-learning model using the relative-time-attributed geological data to generate a trained machine-learning model; applying the trained machine-learning model to the relative-time-attributed geological data to generate one or more predictions of geological phenomena with respect to the area of interest; and providing a user interface that includes a visualization of the one or more predictions of geological phenomena, the visualization including a representation of the area of interest and an indication of a likelihood that the one or more predictions of geological phenomena exists at one or more locations included in the area of interest.

Example 2 is the system of example 1, wherein the operation of pre-processing the historical geological data includes: determining, among a plurality of pre-processing techniques, the selected, relative time pre-processing technique to use for pre-processing the historical geological data; and further pre-processing the historical geological data using a subsequent, relative-time pre-processing technique of the plurality of pre-processing techniques, the subsequent, relative-time pre-processing technique being different than the selected, relative-time pre-processing technique.

Example 3 is the system of any of examples 1-2, wherein the plurality of pre-processing techniques includes an initial relative timing pre-processing technique, an event barcode pre-processing technique, an event histogram pre-processing technique, a closest age pre-processing technique, and a total count pre-processing technique.

Example 4 is the system of example 1, wherein the operation of applying the trained machine-learning model to the relative-time-attributed geological data to generate the one or more predictions of geological phenomena with respect to the area of interest includes applying the trained machine-learning model to determine a likelihood that a particular natural resource deposit has formed at or adjacent to the area of interest, and wherein the particular natural resource deposit includes a hydrocarbon reservoir.

Example 5 is the system of example 1, wherein the operation of applying the trained machine-learning model to the relative-time-attributed geological data to generate the one or more predictions of geological phenomena with respect to the area of interest includes applying the trained machine-learning model to determine a paleo-digital elevation model for the area of interest.

Example 6 is the system of example 1, wherein the user interface includes: a background that includes a spatial definition of the area of interest; and a plurality of indicators, wherein each indicator of the plurality of indicators is positioned on the background in a location on the user interface that corresponds to a corresponding location of the area of interest, and wherein each indicator of the plurality of indicators visually indicates: a likelihood of a natural resource deposit existing at the corresponding location of the area of interest; or a relative orogenic age of the corresponding location of the area of interest.

Example 7 is the system of example 1, wherein the operations further comprise outputting a command to control a wellbore exploration operation using the one or more predictions of geological phenomena, wherein the command includes an indication of whether to form a wellbore in the area of interest.

Example 8 is a method comprising: receiving, by a computing device, historical geological data that includes geological data about an area of interest; pre-processing, by the computing device, the historical geological data by applying a selected, relative-time pre-processing technique to the historical geological data with respect to time-attributed geological phenomena to generate relative-time-attributed geological data; training, by the computing device, a machine-learning model using the relative-time-attributed geological data to generate a trained machine-learning model; applying, by the computing device, the trained machine-learning model to the relative-time-attributed geological data to generate one or more predictions of geological phenomena with respect to the area of interest; and providing, by the computing device, a user interface that includes a visualization of the one or more predictions of geological phenomena, the visualization including a representation of the area of interest and an indication of a likelihood that the one or more predictions of geological phenomena exists at one or more locations included in the area of interest.

Example 9 is the method of example 8, wherein pre-processing the historical geological data includes: determining, by the computing device and among a plurality of pre-processing techniques, the selected, relative time pre-processing technique to use for pre-processing the historical geological data; and further pre-processing, by the computing device, the historical geological data using a subsequent, relative-time pre-processing technique of the plurality of pre-processing techniques, the subsequent, relative-time pre-processing technique being different than the selected, relative-time pre-processing technique.

Example 10 is the method of any of examples 8-9, wherein the plurality of pre-processing techniques includes an initial relative timing pre-processing technique, an event barcode pre-processing technique, an event histogram pre-processing technique, a closest age pre-processing technique, and a total count pre-processing technique.

Example 11 is the method of example 8, wherein applying the trained machine-learning model to the relative-time-attributed geological data to generate the one or more predictions of geological phenomena with respect to the area of interest includes applying, by the computing device, the trained machine-learning model to determine a likelihood that a particular natural resource deposit has formed at or adjacent to the area of interest, and wherein the particular natural resource deposit includes a hydrocarbon reservoir.

Example 12 is the method of example 8, wherein applying the trained machine-learning model to the relative-time-attributed geological data to generate the one or more predictions of geological phenomena with respect to the area of interest includes applying, by the computing device, the trained machine-learning model to determine a paleo-digital elevation model for the area of interest.

Example 13 is the method of example 8, wherein the user interface includes: a background that includes a spatial definition of the area of interest; and a plurality of indicators, wherein each indicator of the plurality of indicators is positioned on the background in a location on the user interface that corresponds to a corresponding location of the area of interest, and wherein each indicator of the plurality of indicators visually indicates: a likelihood of a natural resource deposit existing at the corresponding location of the area of interest; or a relative orogenic age of the corresponding location of the area of interest.

Example 14 is the method of example 8, further comprising outputting, by the computing device, a command to control a wellbore exploration operation using the one or more predictions of geological phenomena, wherein the command includes an indication of whether to form a wellbore in the area of interest.

Example 15 is a non-transitory computer-readable medium comprising instructions that are executable by a processing device for causing the processing device to perform operations comprising: receiving historical geological data that includes geological data about an area of interest; pre-processing the historical geological data by applying a selected, relative-time pre-processing technique to the historical geological data with respect to time-attributed geological phenomena to generate relative-time-attributed geological data; training a machine-learning model using the relative-time-attributed geological data to generate a trained machine-learning model; applying the trained machine-learning model to the relative-time-attributed geological data to generate one or more predictions of geological phenomena with respect to the area of interest; and providing a user interface that includes a visualization of the one or more predictions of geological phenomena, the visualization including a representation of the area of interest and an indication of a likelihood that the one or more predictions of geological phenomena exists at one or more locations included in the area of interest.

Example 16 is the non-transitory computer-readable medium of example 15, wherein the plurality of pre-processing techniques includes an initial relative timing pre-processing technique, an event barcode pre-processing technique, an event histogram pre-processing technique, a closest age pre-processing technique, and a total count pre-processing technique, and wherein the operation of pre-processing the historical geological data includes: determining, among a plurality of pre-processing techniques, the selected, relative time pre-processing technique to use for pre-processing the historical geological data; and further pre-processing the historical geological data using a subsequent, relative-time pre-processing technique of the plurality of pre-processing techniques, the subsequent, relative-time pre-processing technique being different than the selected, relative-time pre-processing technique.

Example 17 is the non-transitory computer-readable medium of example 15, wherein the operation of applying the trained machine-learning model to the relative-time-attributed geological data to generate the one or more predictions of geological phenomena with respect to the area of interest includes applying the trained machine-learning model to determine a likelihood that a particular natural resource deposit has formed at or adjacent to the area of interest, and wherein the particular natural resource deposit includes a hydrocarbon reservoir.

Example 18 is the non-transitory computer-readable medium of example 15, wherein the operation of applying the trained machine-learning model to the relative-time-attributed geological data to generate the one or more predictions of geological phenomena with respect to the area of interest includes applying the trained machine-learning model to determine a paleo-digital elevation model for the area of interest.

Example 19 is the non-transitory computer-readable medium of example 15, wherein the user interface includes: a background that includes a spatial definition of the area of interest; and a plurality of indicators, wherein each indicator of the plurality of indicators is positioned on the background in a location on the user interface that corresponds to a corresponding location of the area of interest, and wherein each indicator of the plurality of indicators visually indicates: a likelihood of a natural resource deposit existing at the corresponding location of the area of interest; or a relative orogenic age of the corresponding location of the area of interest.

Example 20 is the non-transitory computer-readable medium of example 15, wherein the operations further comprise outputting a command to control a wellbore exploration operation using the one or more predictions of geological phenomena, wherein the command includes an indication of whether to form a wellbore in the area of interest.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:
1. A system comprising:
a processing device; and a non-transitory computer-readable memory device that includes instructions executable by the processing device for causing the processing device to perform operations comprising:

receiving historical geological data that includes data about an area of interest;

pre-processing the historical geological data by applying a selected pre-processing technique to the historical geological data with respect to time-attributed geological phenomena to generate geological data, wherein the selected pre-processing technique adjusts the historical geological data to indicate a temporal relationship between the historical geological data and the time-attributed geological phenomena by:

determining an age of the historical geological data relative to the time-attributed geological phenomena;

generating the geological data by restricting the historical geological data to a time window based on the age of the historical geological data relative to the time-attributed geological phenomena, the time window being before present day; and splitting the time window into a plurality of bins, each bin of the plurality of bins comprising a binary value that indicates whether a geological phenomenon occurred in a subset of the time window corresponding with the bin;

training a machine-learning model using the geological data to generate a trained machine-learning model;

applying the trained machine-learning model to the geological data to generate one or more predictions of geological phenomena with respect to the area of interest;

providing a user interface that includes a visualization of the one or more predictions of geological phenomena, the visualization including a representation of the area of interest and an indication of a likelihood that the one or more predictions of geological phenomena exists at one or more locations included in the area of interest; and outputting a command to control a natural resource operation for forming a wellbore in the area of interest, the command comprising instructions that are executable to adjust a direction of a drill bit in response to receiving the one or more predictions of geological phenomena to alter a trajectory of the wellbore.

2. The system of claim 1, wherein the operation of pre-processing the historical geological data includes:

determining, among a plurality of pre-processing techniques, the selected pre-processing technique to use for pre-processing the historical geological data; and further pre-processing the historical geological data using a subsequent pre-processing technique of the plurality of pre-processing techniques, the subsequent-pre-processing technique being different than the selected pre-processing technique.

3. The system of claim 2, wherein the plurality of pre-processing techniques includes an initial relative timing pre-processing technique, an event barcode pre-processing technique, an event histogram pre-processing technique, a closest age pre-processing technique, and a total count pre-processing technique.

4. The system of claim 1, wherein the operation of applying the trained machine-learning model to the geological data to generate the one or more predictions of geological phenomena with respect to the area of interest includes applying the trained machine-learning model to determine a likelihood that a particular natural resource deposit has formed at or adjacent to the area of interest, and wherein the particular natural resource deposit includes a hydrocarbon reservoir.

5. The system of claim 1, wherein the operation of applying the trained machine-learning model to the geological data to generate the one or more predictions of geological phenomena with respect to the area of interest includes applying the trained machine-learning model to determine a paleo-digital elevation model for the area of interest.

6. The system of claim 1, wherein the user interface includes:

a background that includes a spatial definition of the area of interest; and a plurality of indicators, wherein each indicator of the plurality of indicators is positioned on the background in a location on the user interface that corresponds to a corresponding location of the area of interest, and wherein each indicator of the plurality of indicators visually indicates:

a likelihood of a natural resource deposit existing at the corresponding location of the area of interest; or a relative orogenic age of the corresponding location of the area of interest.

7. A method comprising:

receiving, by a computing device, historical geological data that includes geological data about an area of interest;

pre-processing, by the computing device, the historical geological data by applying a selected pre-processing technique to the historical geological data with respect to time-attributed geological phenomena to generate geological data, wherein the selected pre-processing technique adjusts the historical geological data to indicate a temporal relationship between the historical geological data and the time-attributed geological phenomena by:

determining an age of the historical geological data relative to the time-attributed geological phenomena;

generating the geological data by restricting the historical geological data to a time window based on the age of the historical geological data relative to the time-attributed geological phenomena, the time window being before present day; and splitting the time window into a plurality of bins, each bin of the plurality of bins comprising a binary value that indicates whether a geological phenomenon occurred in a subset of the time window corresponding with the bin;

training, by the computing device, a machine-learning model using the geological data to generate a trained machine-learning model;

applying, by the computing device, the trained machine-learning model to the geological data to generate one or more predictions of geological phenomena with respect to the area of interest;

providing, by the computing device, a user interface that includes a visualization of the one or more predictions of geological phenomena, the visualization including a representation of the area of interest and an indication of a likelihood that the one or more predictions of geological phenomena exists at one or more locations included in the area of interest; and outputting a command to control a natural resource operation for forming a wellbore in the area of interest, the command comprising instructions that are executable to adjust a direction of a drill bit in response to receiving the one or more predictions of geological phenomena to alter a trajectory of the wellbore.

8. The method of claim 7, wherein pre-processing the historical geological data includes:

determining, by the computing device and among a plurality of pre-processing techniques, the selected pre-processing technique to use for pre-processing the historical geological data; and further pre-processing, by the computing device, the historical geological data using a subsequent pre-processing technique of the plurality of pre-processing techniques, the subsequent pre-processing technique being different than the selected pre-processing technique.

9. The method of claim 8, wherein the plurality of pre-processing techniques includes an initial relative timing pre-processing technique, an event barcode pre-processing technique, an event histogram pre-processing technique, a closest age pre-processing technique, and a total count pre-processing technique.

10. The method of claim 7, wherein applying the trained machine-learning model to the geological data to generate the one or more predictions of geological phenomena with respect to the area of interest includes applying, by the computing device, the trained machine-learning model to determine a likelihood that a particular natural resource deposit has formed at or adjacent to the area of interest, and wherein the particular natural resource deposit includes a hydrocarbon reservoir.

11. The method of claim 7, wherein applying the trained machine-learning model to the geological data to generate the one or more predictions of geological phenomena with respect to the area of interest includes applying, by the computing device, the trained machine-learning model to determine a paleo-digital elevation model for the area of interest.

12. The method of claim 7, wherein the user interface includes:

a background that includes a spatial definition of the area of interest; and a plurality of indicators, wherein each indicator of the plurality of indicators is positioned on the background in a location on the user interface that corresponds to a corresponding location of the area of interest, and wherein each indicator of the plurality of indicators visually indicates:

a likelihood of a natural resource deposit existing at the corresponding location of the area of interest; or a relative orogenic age of the corresponding location of the area of interest.

13. The method of claim 7, wherein the command includes an indication of whether to form a wellbore in the area of interest.

14. A non-transitory computer-readable medium comprising instructions that are executable by a processing device for causing the processing device to perform operations comprising:

receiving historical geological data that includes geological data about an area of interest;

pre-processing the historical geological data by applying a selected pre-processing technique to the historical geological data with respect to time-attributed geological phenomena to generate geological data, wherein the selected pre-processing technique adjusts the historical geological data to indicate a temporal relationship between the historical geological data and the time-attributed geological phenomena by:

determining an age of the historical geological data relative to the time-attributed geological phenomena;

generating the geological data by restricting the historical geological data to a time window based on the age of the historical geological data relative to the time-attributed geological phenomena, the time window being before present day; and splitting the time window into a plurality of bins, each bin of the plurality of bins comprising a binary value that indicates whether a geological phenomenon occurred in a subset of the time window corresponding with the bin;

training a machine-learning model using the geological data to generate a trained machine-learning model;

applying the trained machine-learning model to the geological data to generate one or more predictions of geological phenomena with respect to the area of interest;

providing a user interface that includes a visualization of the one or more predictions of geological phenomena, the visualization including a representation of the area of interest and an indication of a likelihood that the one or more predictions of geological phenomena exists at one or more locations included in the area of interest; and outputting a command to control a natural resource operation for forming a wellbore in the area of interest, the command comprising instructions that are executable to adjust a direction of a drill bit in response to receiving the one or more predictions of geological phenomena to alter a trajectory of the wellbore.

15. The non-transitory computer-readable medium of claim 14, wherein the plurality of pre-processing techniques includes an initial relative timing pre-processing technique, an event barcode pre-processing technique, an event histogram pre-processing technique, a closest age pre-processing technique, and a total count pre-processing technique, and wherein the operation of pre-processing the historical geological data includes:

determining, among a plurality of pre-processing techniques, the selected pre-processing technique to use for pre-processing the historical geological data; and further pre-processing the historical geological data using a subsequent pre-processing technique of the plurality of pre-processing techniques, the subsequent-pre-processing technique being different than the selected pre-processing technique.

16. The non-transitory computer-readable medium of claim 14, wherein the operation of applying the trained machine-learning model to the geological data to generate the one or more predictions of geological phenomena with respect to the area of interest includes applying the trained machine-learning model to determine a likelihood that a particular natural resource deposit has formed at or adjacent to the area of interest, and wherein the particular natural resource deposit includes a hydrocarbon reservoir.

17. The non-transitory computer-readable medium of claim 14, wherein the operation of applying the trained machine-learning model to the geological data to generate the one or more predictions of geological phenomena with respect to the area of interest includes applying the trained machine-learning model to determine a paleo-digital elevation model for the area of interest.

18. The non-transitory computer-readable medium of claim 14, wherein the user interface includes:

a background that includes a spatial definition of the area of interest; and a plurality of indicators, wherein each indicator of the plurality of indicators is positioned on the background in a location on the user interface that corresponds to a corresponding location of the area of interest, and wherein each indicator of the plurality of indicators visually indicates:

a likelihood of a natural resource deposit existing at the corresponding location of the area of interest; or relative orogenic age of the corresponding location of the area of interest.

19. The system of claim 1, wherein the operation of training the machine-learning model using the geological data to generate the trained machine-learning model comprises:

inputting the geological data to the machine-learning model;

adjusting, using a first subset of the geological data and based on a loss function, one or more parameters of the machine-learning model to generate the trained machine-learning model; and validating the trained machine-learning model, wherein validating the trained machine-learning model comprises:

inputting a second subset of the geological data that is different from the first subset into the trained machine-learning model to generate output;

transmitting the output from the trained machine-learning model to a separate model to generate an error metric based on the output and an acceptance criteria; and validating the trained machine-learning model in response to determining that the error metric matches the acceptance criteria.

* * * * *